(12) United States Patent  (10) Patent No.: US 9,119,381 B2
Gingerich  (45) Date of Patent: Sep. 1, 2015

(54) POULTRY MIGRATION FENCE SYSTEM

(71) Applicant: Paul J. Gingerich, Hickory, KY (US)

(72) Inventor: Paul J. Gingerich, Hickory, KY (US)

( * ) Notice: Subject to any disclaimer, the term of this patent is extended or adjusted under 35 U.S.C. 154(b) by 245 days.

(21) Appl. No.: 13/769,244

(22) Filed: Feb. 15, 2013

(65) Prior Publication Data
US 2014/0230742 A1  Aug. 21, 2014

(51) Int. Cl.
*A01K 1/00* (2006.01)
*A01K 31/22* (2006.01)
*E06B 11/02* (2006.01)

(52) U.S. Cl.
CPC ............... *A01K 31/22* (2013.01); *A01K 1/0005* (2013.01); *E06B 11/023* (2013.01)

(58) Field of Classification Search
CPC ... E06B 11/023; E06B 11/026; E06B 11/027; A01K 1/0029; A01K 1/0023; A01K 1/0017
USPC ............... 119/416, 437, 441, 494, 510, 524; 52/102; 47/33; 49/399; 16/87; 248/316.1, 316.7; 256/73
See application file for complete search history.

(56) References Cited

U.S. PATENT DOCUMENTS

| | | | | |
|---|---|---|---|---|
| 263,033 | A * | 8/1882 | Enos | 256/31 |
| 694,761 | A * | 3/1902 | Lathrop | 256/31 |
| 893,438 | A * | 7/1908 | Caesar | 248/74.1 |
| 1,594,896 | A * | 8/1926 | Mighell | 160/180 |
| 2,593,506 | A * | 4/1952 | Wales | 29/432 |
| 3,017,860 | A | 1/1962 | Wilson | |
| 3,525,290 | A * | 8/1970 | Pelsue | 135/126 |
| 3,651,851 | A | 3/1972 | Curtis | |
| 3,910,560 | A * | 10/1975 | Goetz | 256/24 |
| 4,041,646 | A * | 8/1977 | Mittag | 49/385 |
| 4,553,739 | A * | 11/1985 | Baines | 256/23 |
| 4,932,619 | A * | 6/1990 | Usui | 248/74.1 |
| 5,564,367 | A | 10/1996 | Boyanton | |
| 5,779,227 | A * | 7/1998 | Elkins et al. | 256/31 |
| 6,257,559 | B1 * | 7/2001 | Mouri | 256/26 |
| 6,289,848 | B1 | 9/2001 | Estevez et al. | |
| 6,676,113 | B2 * | 1/2004 | Christensen et al. | 256/25 |
| 6,719,276 | B1 * | 4/2004 | Bush | 256/1 |
| 7,036,798 | B1 * | 5/2006 | Olson | 256/12.5 |
| 7,540,682 | B1 * | 6/2009 | Christensen et al. | 404/6 |
| 7,568,449 | B2 * | 8/2009 | Hirokawa et al. | 119/452 |
| D599,488 | S * | 9/2009 | Christensen et al. | D25/48.5 |
| 7,950,184 | B2 * | 5/2011 | Flannery | 49/57 |

(Continued)

FOREIGN PATENT DOCUMENTS

JP  2002-147026  *  5/2002  ............. E04G 21/32

*Primary Examiner* — Kristen C Hayes
(74) *Attorney, Agent, or Firm* — Richard C Litman

(57) ABSTRACT

The poultry migration fence system includes at least one fence panel rigidly attached to at least one side of a U-shaped open archway. At least one selectively pivotal support rail is mounted to the bottom of the fence panel. The archway allows the fence system to be easily installed by sliding the open end of the archway over a suspended feed/water pipe. The pivotal support rail can be pivoted to a support position where the support rail extends orthogonal to the fence panel in order to provide a stable base for maintaining the upright position of the fence panel, and to a storage position parallel to the extension of the fence panel. A swiveling gate is pivotally attached to one of the legs of the archway so that the gap at the open end can be selectively closed, thereby preventing poultry from crossing towards the other side of the fence panel. Both solid and wire fence panels are provided.

28 Claims, 11 Drawing Sheets

(56) References Cited

U.S. PATENT DOCUMENTS

| | | |
|---|---|---|
| 7,958,850 B2 | 6/2011 | Tsubai |
| 8,074,969 B2 * | 12/2011 | Lee et al. ............... 256/73 |
| 8,720,958 B2 * | 5/2014 | Flannery et al. ......... 292/288 |
| 2011/0001106 A1 * | 1/2011 | Lee et al. ............... 256/73 |

* cited by examiner

POULTRY MIGRATION FENCE SYSTEM

BACKGROUND OF THE INVENTION

1. Field of the Invention

The present invention relates to animal husbandry, and particularly to a poultry migration fence system that provides easy, convenient installation and effective segregation of poultry for the benefit of the overall health and growth of poultry.

2. Description of the Related Art

Many poultry farmers are in charge of raising hundreds, if not thousands of poultry, such as chickens and turkeys, per year. In order to successfully raise poultry, they cannot be allowed to congregate in one area for extended periods of time, since that can lead to overcrowding. Overcrowding creates many health and psychological issues for the birds. For example, the normal circadian rhythms will be difficult to synchronize due to intermittent disturbances from one or more segments of the population while the others are trying to rest. Inadequate rest can lead to immunosuppression and increased susceptibility to diseases. Sanitary conditions also become compromised because the bodily wastes are pooled in the congregated area. Exposure to such concentrated wastes increases the risk of diseases and infections. Most chicken houses have plenty of room to accommodate all the poultry being raised, and it should be fully utilized for proper air circulation and a healthy environment for their physical growth.

In light of the above, it would be a benefit in the art of animal husbandry to provide a fence system that can be easily installed to segregate the poultry and conveniently stored when not in use. Thus, a poultry migration fence system solving the aforementioned problems is desired.

SUMMARY OF THE INVENTION

The poultry migration fence system includes at least one fence panel attached to at least one side of a U-shaped open archway. At least one selectively pivotal support rail is mounted to the bottom of the fence panel. The archway allows the fence system to be easily installed by sliding the open end of the archway over a suspended feed/water pipe. The pivotal support rail can be pivoted to a support position where the support rail extends orthogonal to the fence panel in order to provide a stable base for maintaining the upright position of the fence panel and pivoted to a storage position parallel to the extension of the fence panel. A swiveling gate is pivotally attached to one of the legs of the archway so that the gap at the open end can be selectively closed, thereby preventing poultry from crossing towards the other side of the fence panel. Both solid and wire fence panels are provided.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
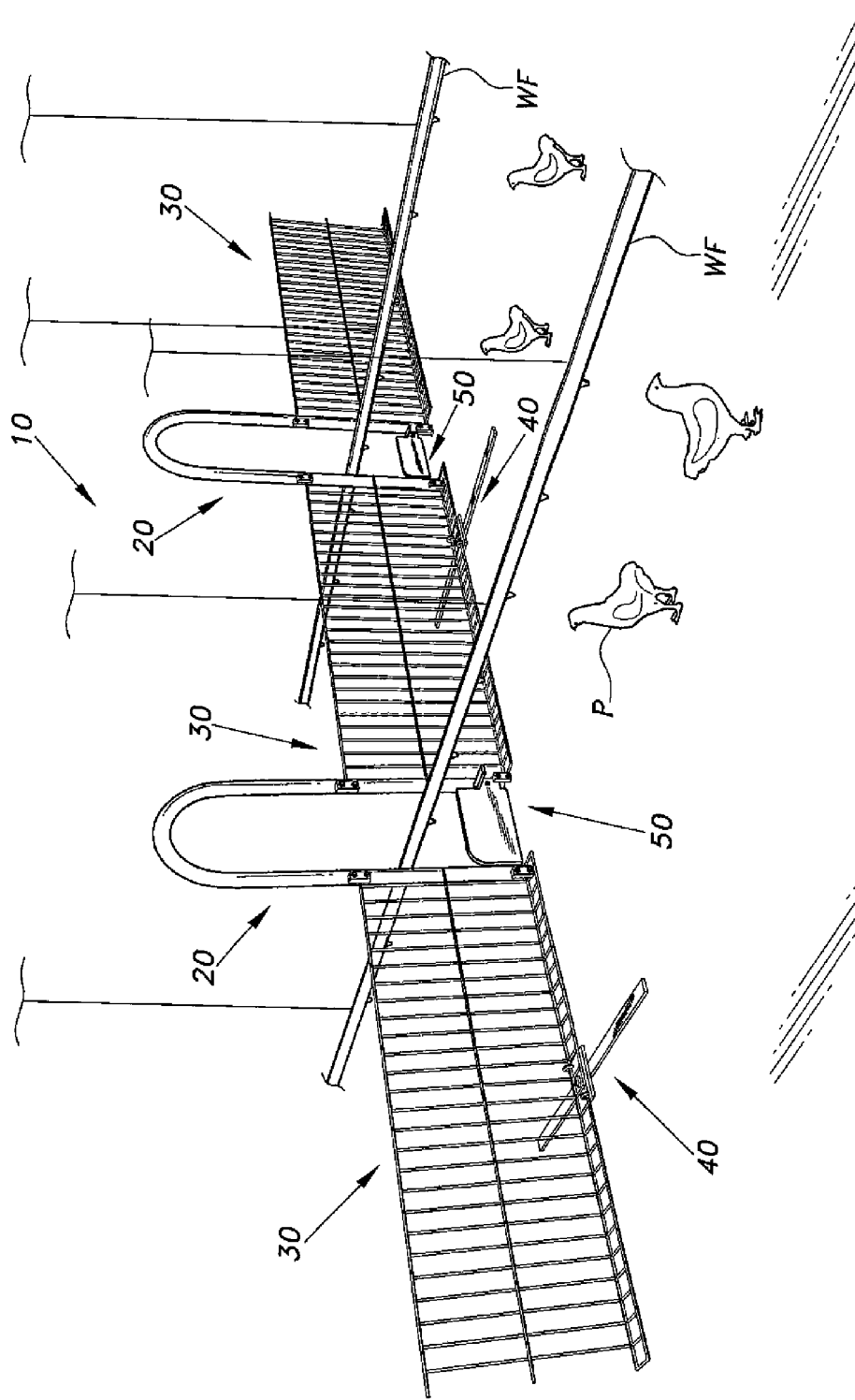
FIG. 1 is an environmental, perspective view of a poultry migration fence system according to the present invention.

The poultry migration fence system, generally referred to by the reference number 10 in the drawings, provides a convenient and easy-to-install fence assembly that prevents undesirable migration of poultry in a poultry farm and maximizes use of available space. Moreover, the poultry migration fence system 10 is constructed so that minimal storage space is required for storage.

Figure 2:
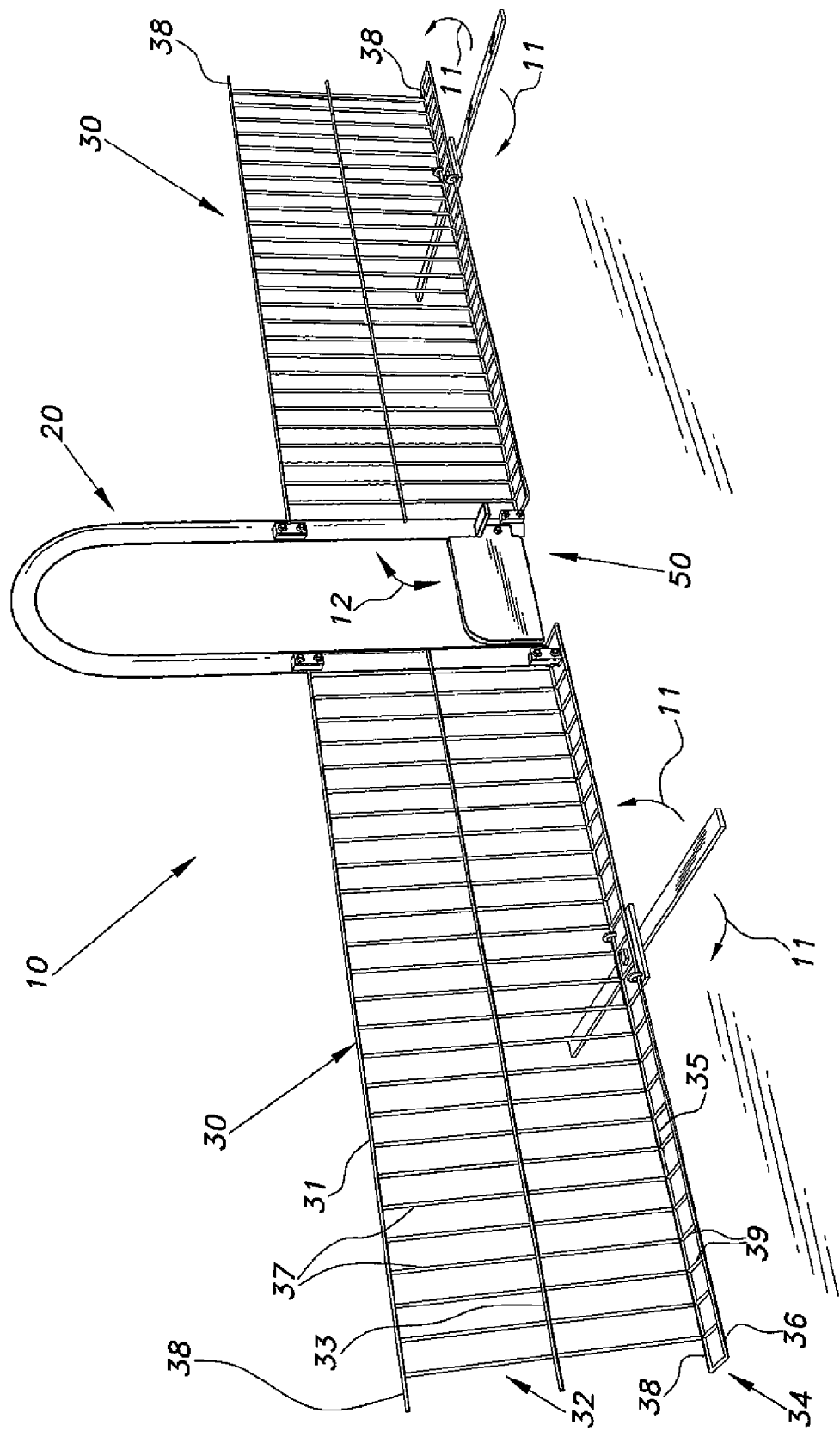
FIG. 2 is a perspective view of the poultry migration fence system of FIG. 1.

As shown in FIGS. 1 and 2, the poultry migration fence system 10 includes at least one elongate, U-shaped archway 20 and at least one fence panel 30 attached to one or both legs 22 of the archway 20. This construction forms a barrier between select sections of the housing for the poultry P, thereby preventing migration of the poultry P between sections.

The archway 20 includes a curved top section and depending legs 22 forming a gap or open section between the legs 22. During installation, the gap allows the user to easily slide the poultry migration fence system 10 over existing, suspended water/feed pipes WF, the pipes WF extending between the legs 22. This process greatly relieves physical stress on the user, compared to conventional fence systems, because bending and kneeling is kept to a minimum. The archway 20 spans respective water/feed pipes WF and allows passage thereof through the poultry migration fence system 10.

The fence panel 30 is an elongate, substantially L-shaped wire fence having an upright, main section 32 and a lower minor section 34 extending perpendicular to the main section 32. Preferably, both the main and minor sections 32, 34 are rectangular or square in shape. Other geometric shapes and patterns, such as circles, ovals, diamonds, polygons and the like, can be used, so long as they provide an effective barrier preventing the poultry P from migrating from one side to another.

Figure 4:
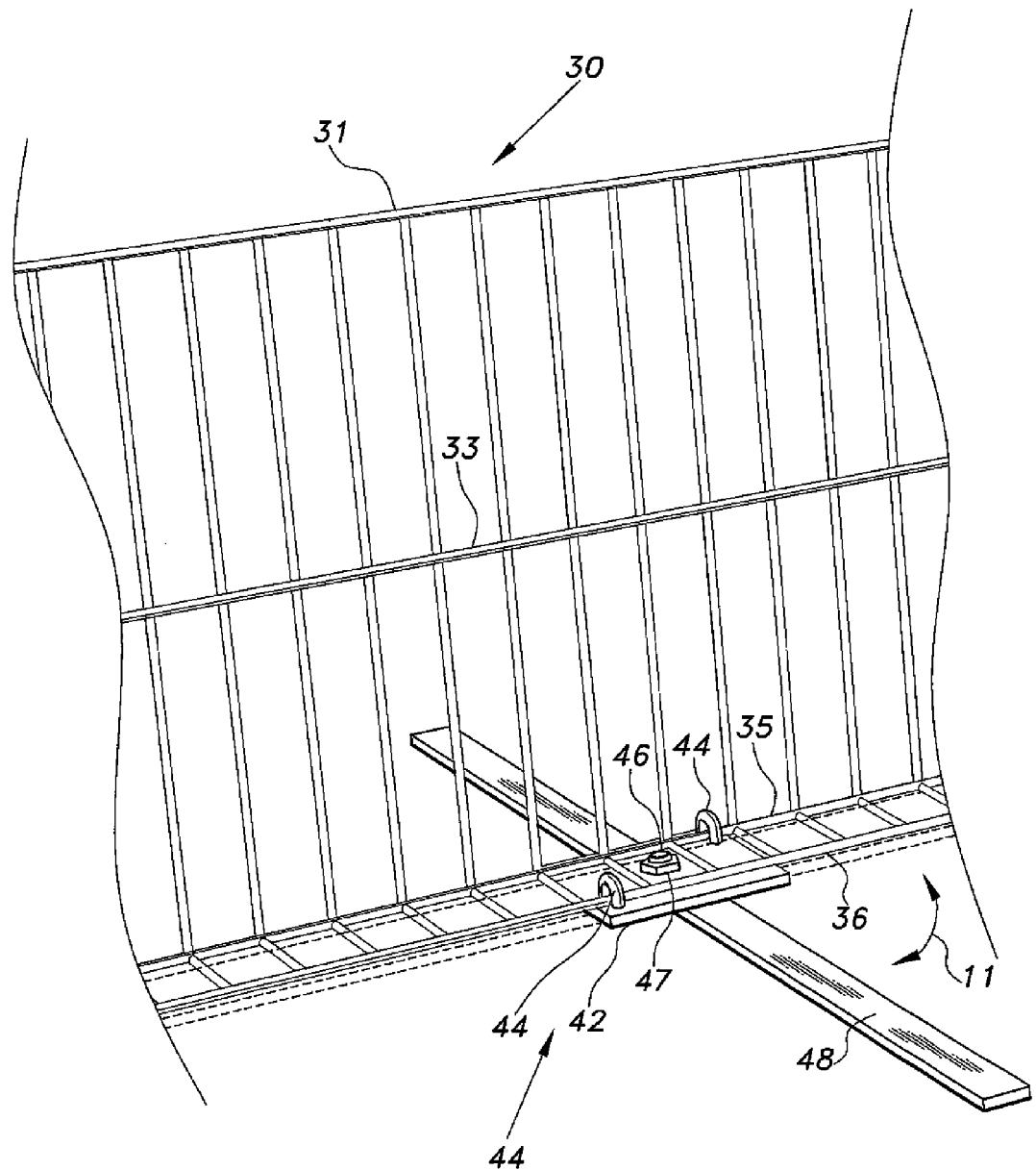
FIG. 4 is a partial perspective view of the pivotal support rail in the poultry migration fence system of FIG. 1.

As best seen in FIGS. 2 and 4, each wire fence includes a top cross member or wire 31, at least one central cross member or wire 33, a bottom cross member or wire 35, an outer cross member or wire 36, a plurality of spaced vertical members or wires 37 extending between the top and bottom cross members 31, 35, and a plurality of lateral spacer members or wires 39. The cross members 31, 33, 35, 36 provide horizontal structural support for the fence panel 30, while the vertical members 37 and the lateral members 39 provide vertical support for the main section 32 and the minor section 34 respectively. The bottom cross member 35 forms a junction between the major and minor sections 32, 34. It is noted that the wire fence can include any number of cross, vertical and lateral members.

Figure 3:
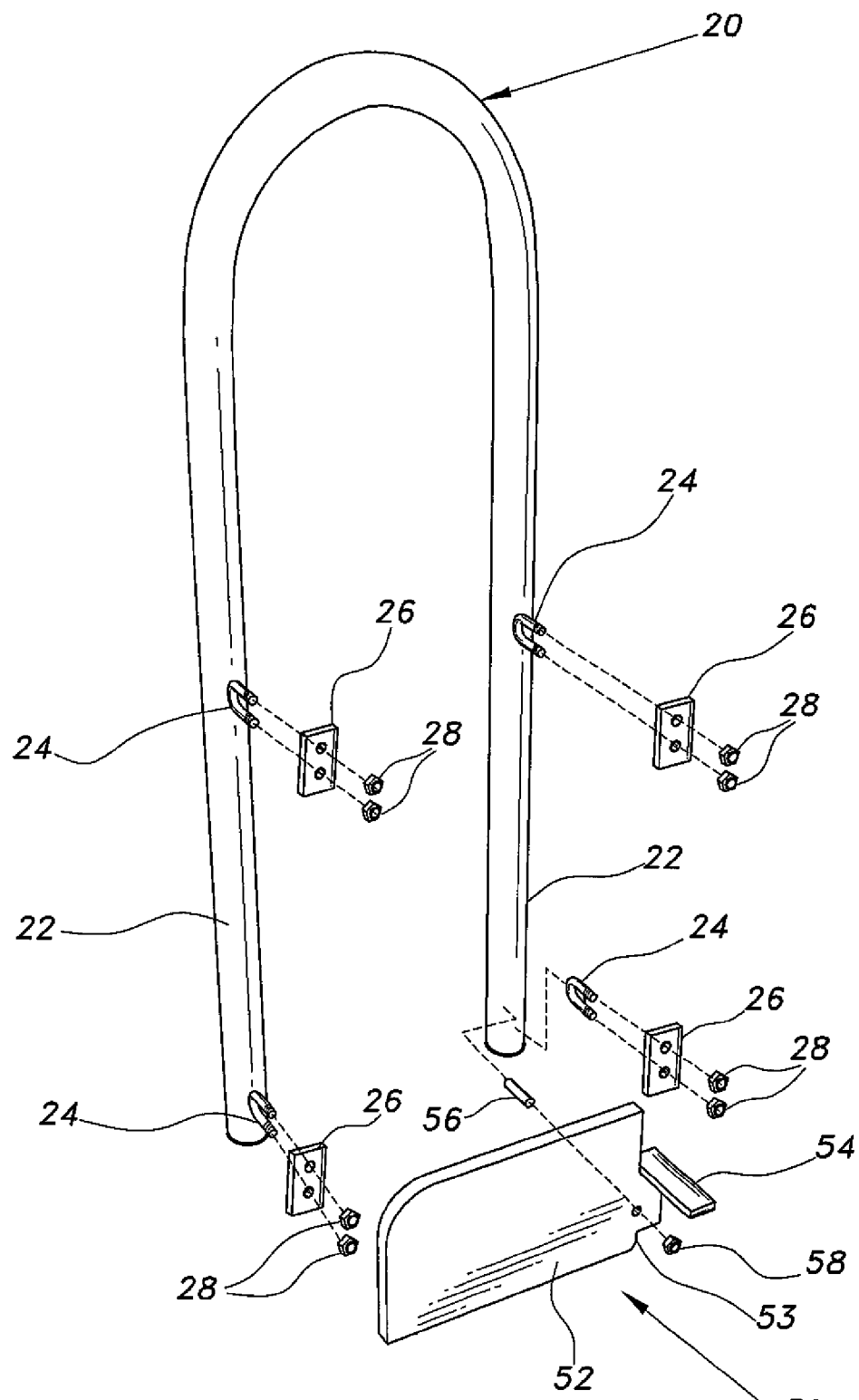
FIG. 3 is an exploded view of the archway and gate in the poultry migration fence system of FIG. 1.

To attach the fence panel to the archway 20, each wire fence includes at least top and bottom extensions 38 extending from the top cross member 31 and the bottom cross member 35 on opposite sides of the main section 32. As shown in FIGS. 2 and 3, the archway 20 includes a plurality of U-bolts 24 rigidly attached to the legs 22, including a spaced pair of U-bolts 24 attach to each leg 22, each U-bolt 24 having threaded ends. The U-bolts 24 can be integrally formed on the legs 22, welded, or adhesively attached to the legs 22. A respective extension 38 of the fence panel 30 is inserted between the legs of the U-bolt 24 and clamped therein by a clamping plate 25 and fasteners or nuts 28. As an alternative to U-bolts 24, a pair of spaced apart threaded studs may extend from each leg 22. Moreover, the extensions 38 can be clamped between the spaced bolts by quick-release clamps.

The fence panel 30 alone may not be able to maintain an upright position for extended periods during use. The extension of the minor section 34 from the main section 32 does not provide sufficient area of support to prevent the fence panel 30 from toppling over, especially since the minor section 34 extends from only one side. In order to provide a more stable base support for the fence panel 30, the poultry migration fence system 10 includes a fence panel support assembly 40 detachably mounted to the minor section 34. As shown in FIGS. 1, 2 and 4, the fence panel support assembly 40 includes a support plate 42 attached below the minor section 34. At least a pair of U-bolts 44 are hooked over the bottom cross member 35 and the outer cross member 36, respectively, and inserted through diagonal corners of the support plate 42. The U-bolts 44 are fastened to the plate 42 via nuts (not shown). Although only two corners of the support plate 42 are shown connected by the U-bolts 44, any number of the corners can be used to attach the support plate 42 to the fence panel 30. An elongate support bar 48 is rotatably mounted to the support plate 42 through a central pivot bolt 46 and nut 47. With this construction, the support rail 48 can be pivoted or rotated from a stowed position (shown in phantom in FIG. 4) to a support position (shown in solid lines) and vice versa, as indicated by the arrow 11.

As can be seen from FIG. 4, the support rail 48 in the support position preferably extends orthogonally from both sides of the plane of the main section 32. This is a very stable configuration that will maintain the upright position of the fence panel 30, even through repeated jostling from poultry P. The stowed or storage position places the support rail 38 into an inconspicuous and non-protruding configuration so that the poultry migration fence assembly 10 can be easily stored by hanging against a wall or stacking with minimal impact on storage space. More than one fence panel support assembly 40 can be mounted to each fence panel 30.

Figure 5:
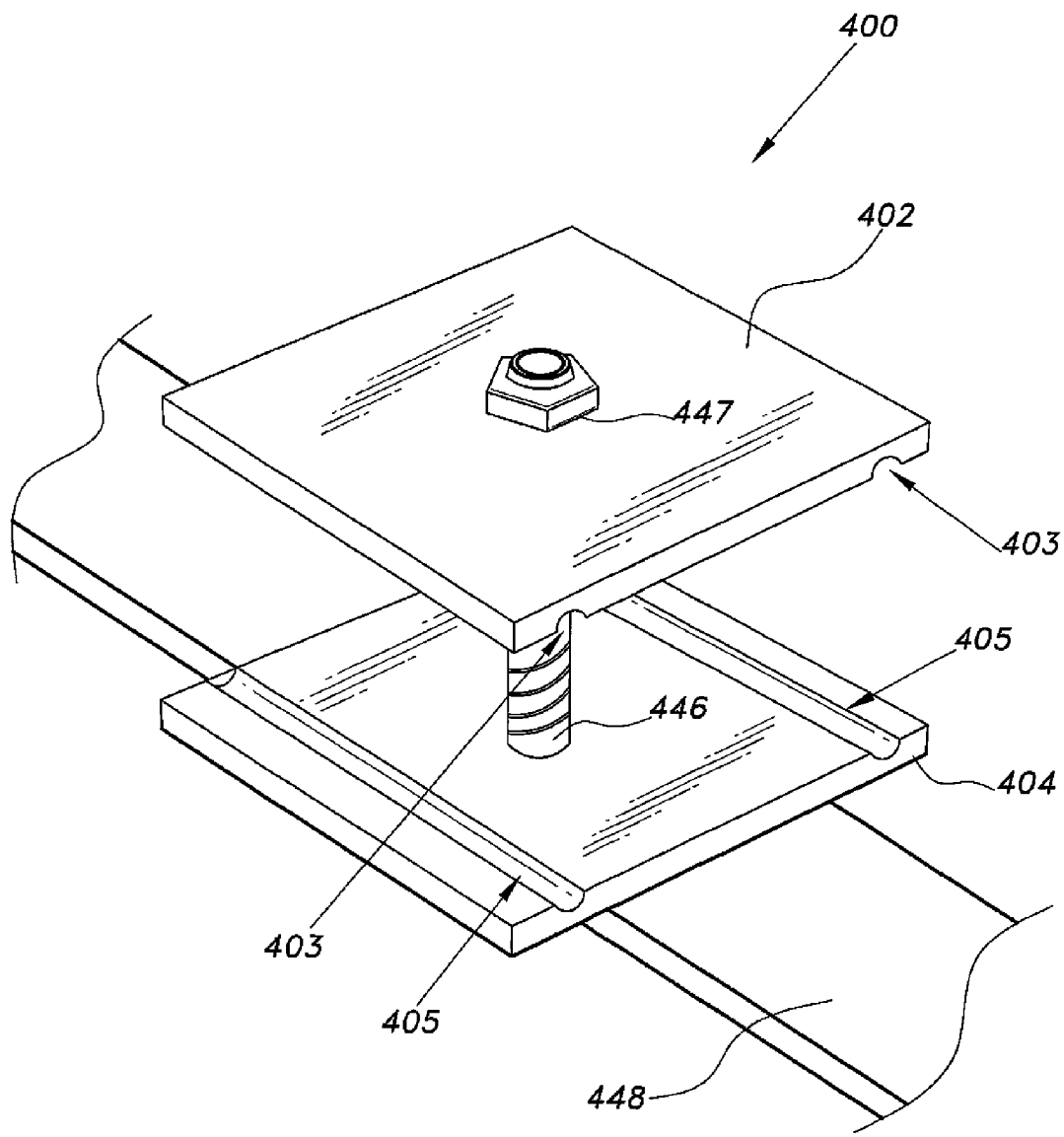
FIG. 5 is an alternative embodiment of a mounting bracket for the pivotal support rail of FIG. 4.

An alternative embodiment of a fence panel support assembly 400 is shown in FIG. 5. In this embodiment, the support for the pivotal support rail 448 is a clamping assembly. As shown, the fence panel support assembly 400 includes an upper clamping plate 402 and a lower clamping plate 404. The upper clamping plate 402 includes a pair of spaced, upper grooves 403 facing downward, while the lower clamping plate 404 includes a pair of spaced, lower grooves 405 facing upward in line with the upper grooves 403. In use, the lower clamping plate 404 is placed underneath the minor section 34 with the lower grooves 405 straddling adjacent lateral members 39 from the bottom. The upper clamping plate 402 is placed atop the minor section 34 over the lower clamping plate 404 so that the upper grooves 403 straddle the same adjacent lateral members 39 from the top. The support rail 448 is pivotally mounted to the upper and lower clamping plates 402, 404 via a bolt 446 and fastener or nut 447. Selective tightening of the nut 447 clamps the clamping plates 402, 404 together, sandwiching the adjacent lateral members 39 between the upper and lower grooves 403, 405. The upper and lower grooves 403, 405 insure that clamping plates 402, 404 are securely mounted to the minor section 34 with minimal unwanted movement. In all other respects, the fence panel support assembly 400 functions substantially the same as the previously mentioned fence panel support assembly 40. As a further alternative, the upper clamping plate 402 and the lower clamping plate 404 can include extending flanges that hook over adjacent lateral members 39 for similar secure engagement with the minor section 34.

Once installed, the gap between the legs 22 in the archway 20 can pose a problem with poultry P attempting to migrate to the other side through said gap. In order to prevent such an occurrence, the poultry migration fence system 10 includes a gate assembly 50 attached to one of the legs 22. As shown in FIGS. 1-3, the gate assembly 50 includes a gate 52 pivotally mounted to one of the legs 22. The gate 52 can be constructed as a substantially rectangular plate having a throughbore near a corner of one side of the plate. The throughbore allows the gate 52 to slide over a bolt 56 disposed on the leg 22. The gate 52 is secured thereto via a fastener or nut 58. The bolt 56 can be permanently affixed to the leg 22, or can be a discrete bolt threaded at both ends for mounting the bolt 56 onto the leg 22. The bolt 56 is preferably disposed above the lower U-bolt 24, and the gate 52 can include a cutout section 53 as clearance for the U-bolt 24 and associated clamping plate 26. The gate 52 is provided with an outwardly extending finger tab or handle 54 for the user to easily and selectively swivel the gate 52 upward to an open position and downward to a closed position crossing the legs of the archway 20, as indicated by the arrow 12 in FIG. 2.

Figure 6A:
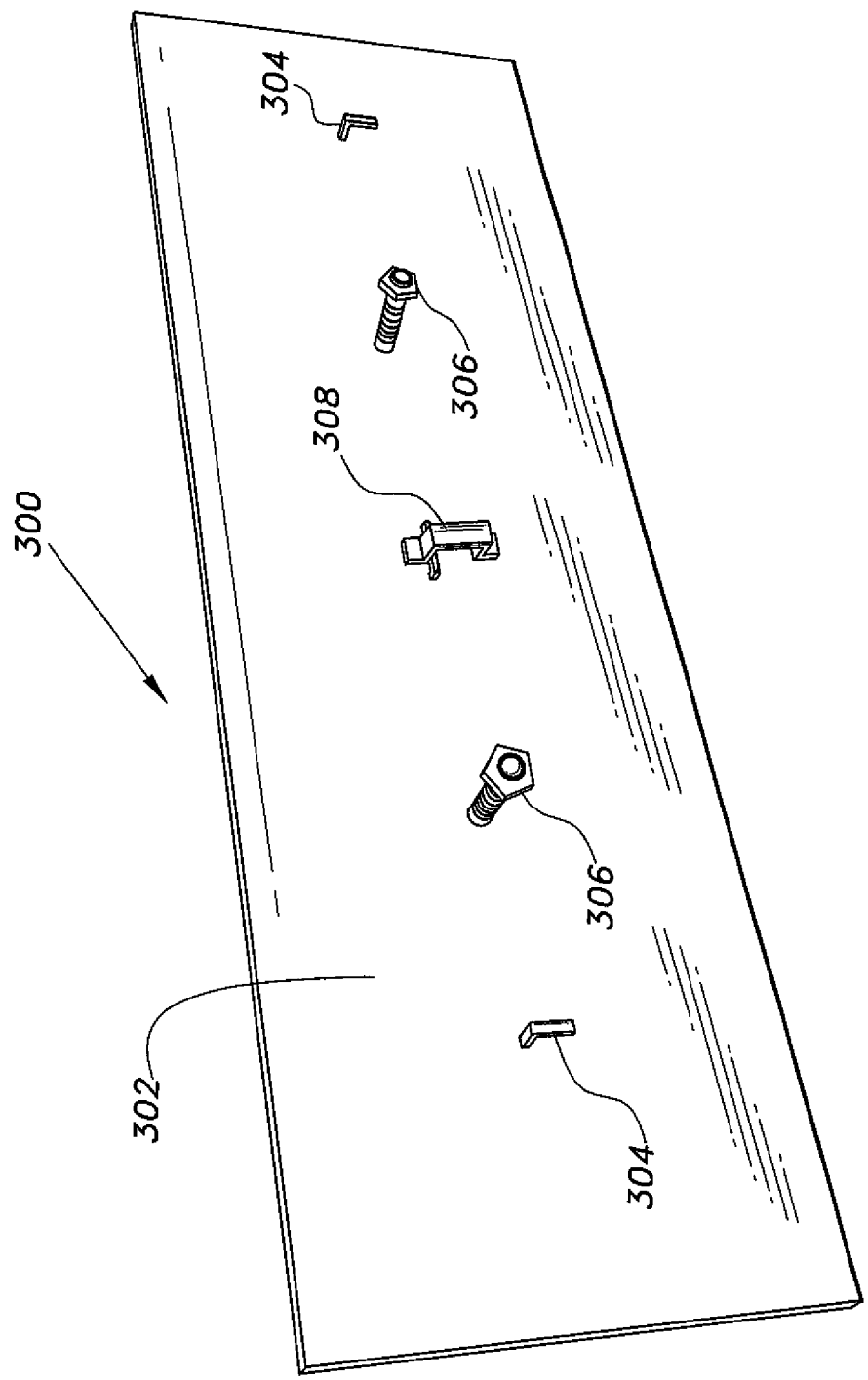
FIG. 6A is a perspective view of a solid fence panel accessory for a poultry migration fence system according to the present invention.
Figure 6B:
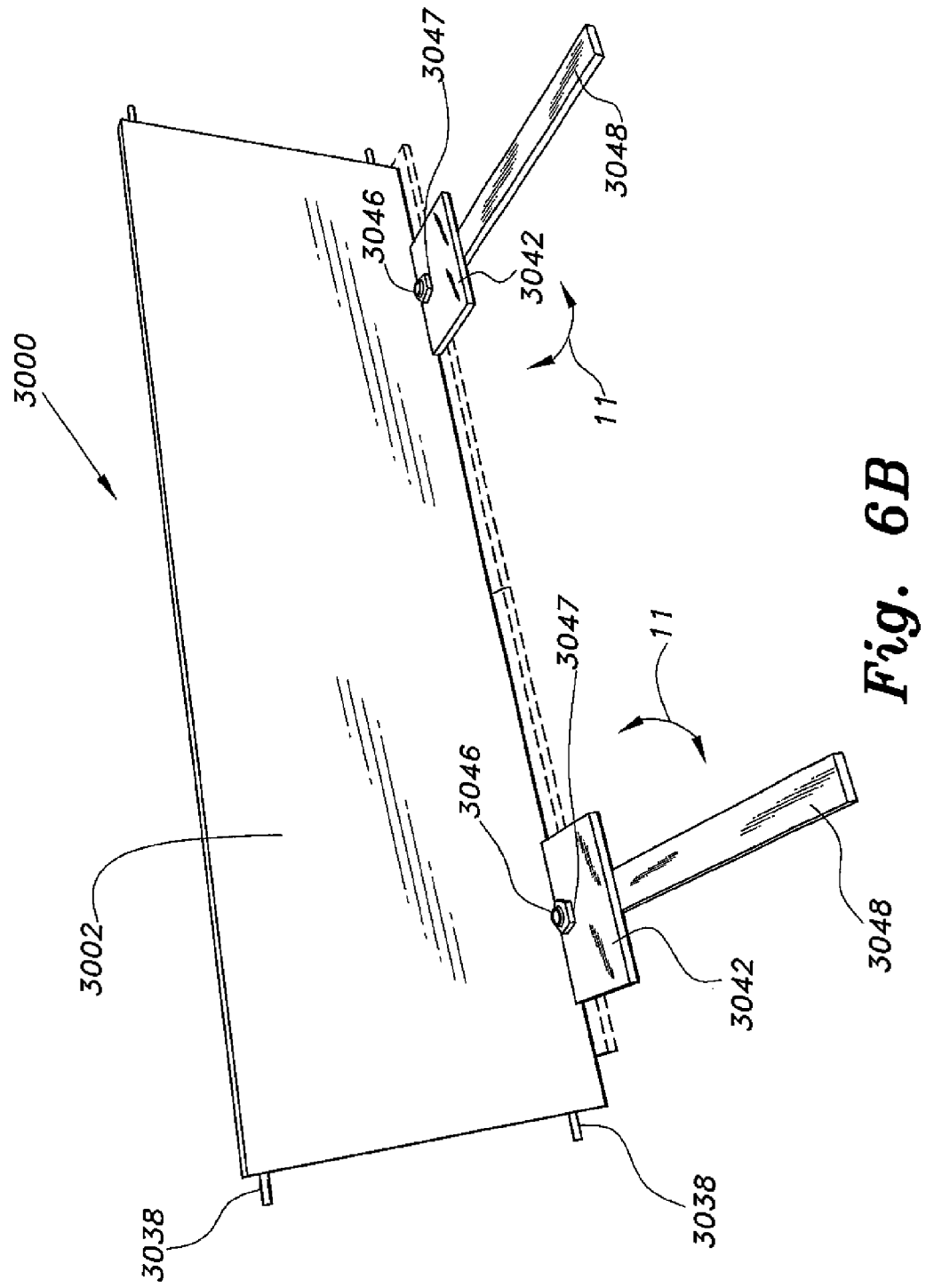
FIG. 6B is a perspective view of an alternative embodiment of a solid fence panel for a poultry migration fence system according to the present invention.

FIGS. 6A and 6B shows alternative fence panels for the poultry migration fence system 10. FIG. 6A shows an accessory in the form of a solid fence panel 302 that can be attached to the wire fence. The solid fence panel 302 is preferably square or rectangular in shape, conforming to the shape of the main section 32. The solid fence panel 302 can be constructed from wood, lightweight steel, plastic, composites and/or combinations thereof. The solid fence panel 302 includes various means for mounting the solid fence panel 302 on the wire fence panel 30, such as hooks 304, bolts 306 and/or a latching mechanism 308. The solid fence panel 302 can be provided with one or a combination of the above means, which are preferably configured for attaching onto the center cross member 33.

FIG. 6B shows a stand-alone solid fence panel 3000. The fence panel 3000 includes a solid fence 3002 constructed from similar materials and shape as the fence panel 300. The opposing sides of the solid fence 3002 include a pair of mounting extensions 3038 to facilitate mounting of the solid fence 3002 onto the archway 20. A pair of support brackets 3042 are disposed at the bottom of the solid fence 3002. A support rail 3048 is pivotally mounted to each support bracket 3042 via a bolt 3046 and fastener 3047. As can be seen from FIG. 6B, the solid fence panel 3000 can replace the wire fence panel 30 and provide the same stability and storage options.

As an alternative to the above, the poultry migration fence system 10 can be provided in a kit that includes the archway 20, the fence panel support assembly 40, 400, the gate assembly 50 and associated mounting hardware for use with conventional wire fences. This allows poultry farmers to assemble fences with the ease of installation, stability and storage mentioned above, and with minimal modifications to existing fences. Moreover, the kit can include the solid fence panels 30 and/or 3000.

Figure 7:
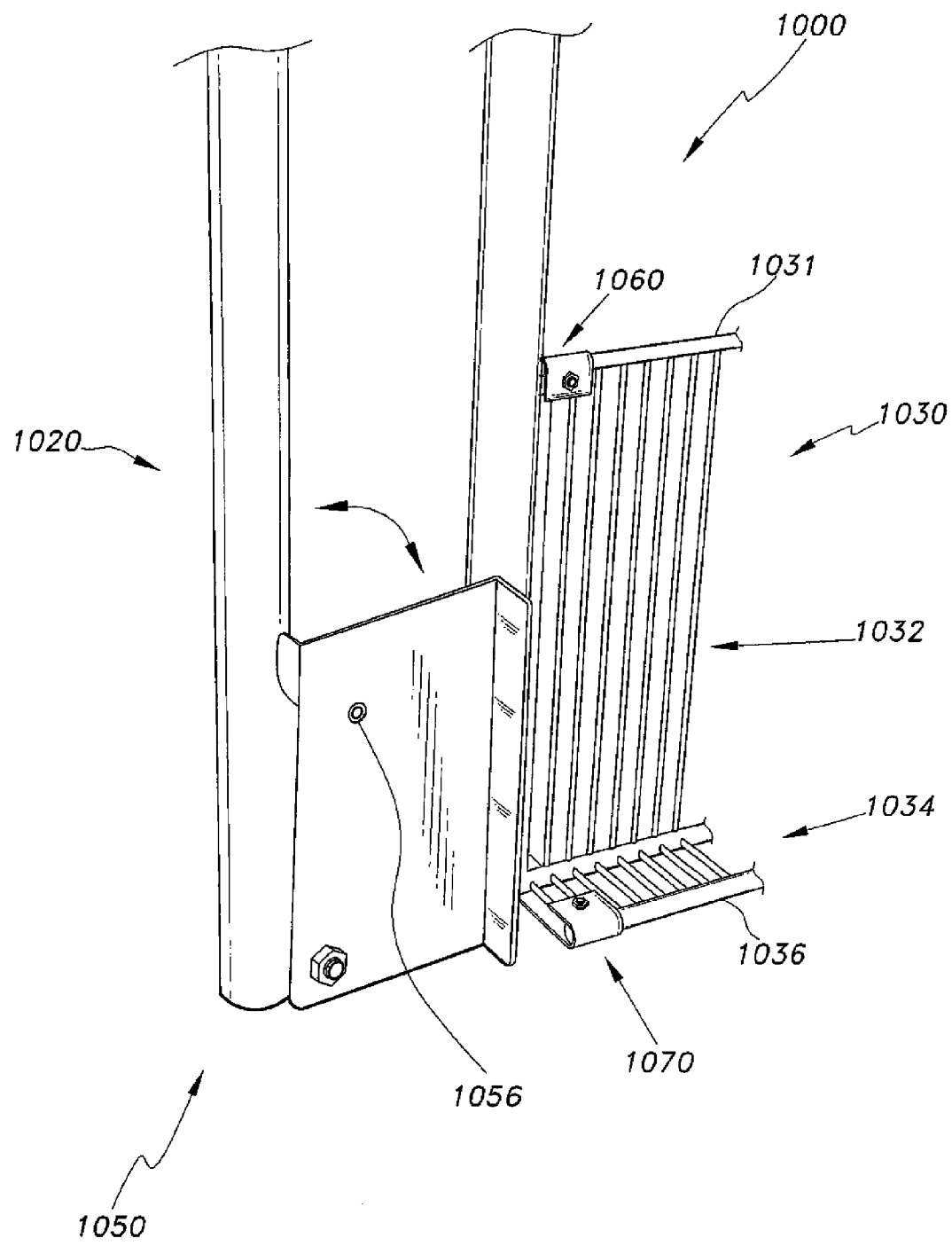
FIG. 7 is a partial perspective view of a further alternative embodiment of a poultry migration fence system according to the present invention, the system particularly including an alternative embodiment of a gate.
Figure 8:
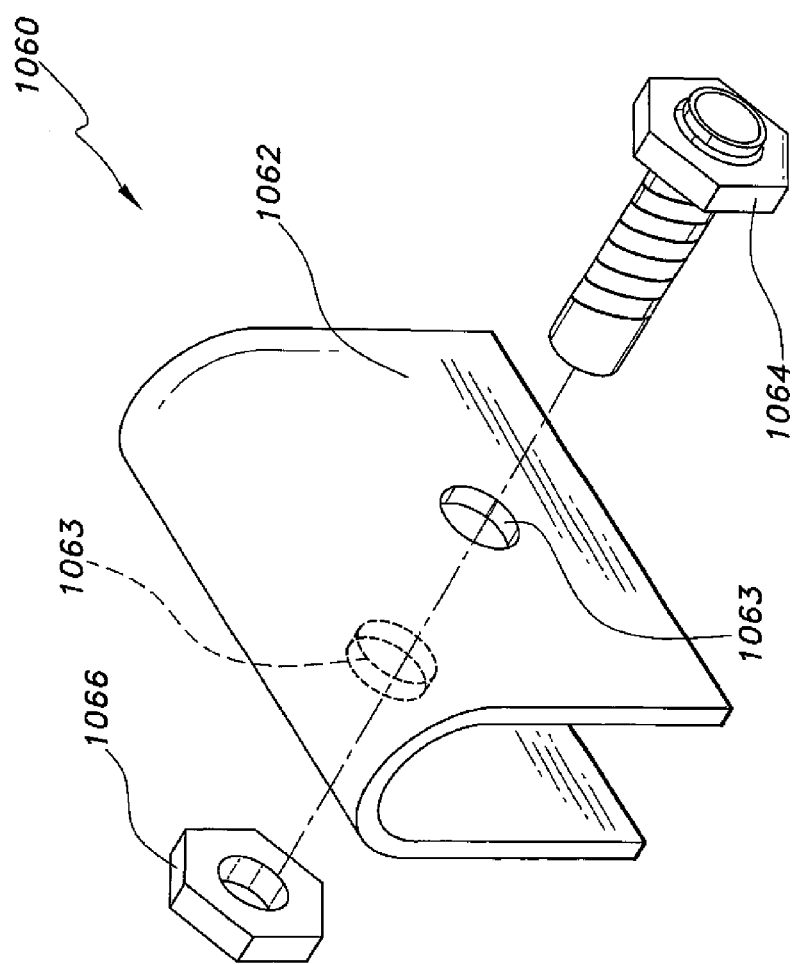
FIG. 8 is an exploded view of an alternative bracket for the fence panel of FIG. 7.
Figure 9:
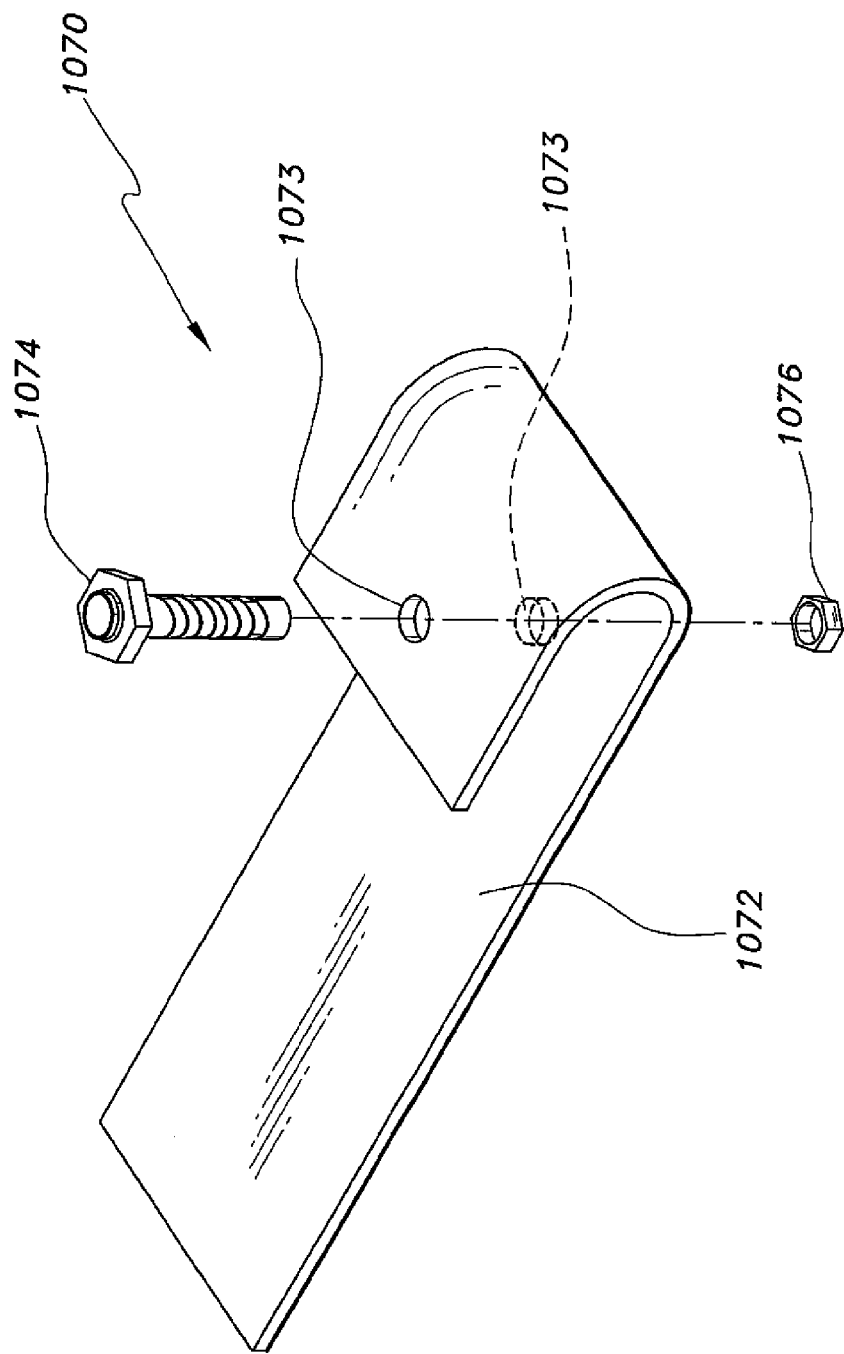
FIG. 9 is an exploded view of another alternative bracket for the fence panel of FIG. 7.

A still further alternative poultry migration fence system 1000 is shown in FIG. 7. This embodiment features an alternative gate assembly and alternative means for attaching a fence panel 1030. As shown in FIGS. 7-9, the poultry migration fence system 1000 includes an upper bracket 1060 and a lower bracket 1070 that facilitate easier and rapid installation of the fence panel 1030.

The upper bracket 1060 is rigidly attached to one of the legs of the archway 1020, e.g., a lateral edge of the bracket 1060 is welded to the archway leg. The upper bracket 1060 can be placed at any required or desired height either by adjustable mounting or by fixed means in order to accommodate the height of the fence panel 1030. The upper bracket 1060 includes an inverted U-shaped bracket plate 1062 configured to mainly receive the top cross member 1031 on the main section 1032 of the fence panel 1030. In this embodiment, the bracket plate 1062 is bent into a U-shape, forming an opening that wraps around the top cross member 1031 to provide a clamping mechanism. The bracket plate 1062 includes aligned holes 1063 through which a fastener, such as a bolt 1064, can pass below the cross member 1031 and be secured by a nut 1066. When the upper bracket 1060 is mounted to the top of the main section 1032, this fastener 1064, 1066 can be tightened to clamp the received portion of the main section 1032 therein. As an alternative to the above, the bracket plate 1062 can be constructed as a separate member that can be detachably mounted to the archway 1020 via separate fasteners, and additional fasteners, such as cam fasteners, can be used to clamp the bracket plate 1062 onto the main section 1032.

The lower bracket 1070 is also rigidly attached to one of the legs of the archway 1020, e.g., the bottom edge of the archway leg may be welded to a corner of the lower bracket 1070. The lower bracket 1070 includes an elongate bracket plate 1072 having a U-shaped end that is configured to mainly receive the outer cross member 1036 on the minor section 1034 of the fence panel 1030. In this embodiment, the bracket plate 1072 is J-shaped, where the hook forms an opening that wraps around the outer cross member 1036 for clamping. The bracket plate 1072 includes aligned holes 1073 through which a fastener, such as a bolt 1074, can pass and be secured by a nut 1076. When the lower bracket 1070 is mounted to the outer portion of the minor section 1034, this fastener can be tightened to clamp the received portion of the minor section 1034 therein. As an alternative to the above, the bracket plate 1072 can be constructed as a separate member that can be detachably mounted to the archway 1020 via separate fasteners, and additional fasteners, such as cam fasteners, can be used to clamp the bracket plate 1072 onto the minor section 1034. As a further alternative, the lower bracket 1070 can be constructed to adjustably accommodate various thicknesses of the minor section 1036, e.g., a flexible hook section, a separate plate for the hook section spanning at least a portion of the width of the minor section 1036 or the whole width, a pivotal hook section, and the like. It is noted that the above upper bracket 1060 and the lower bracket 1070 can be applied to any of the previously described embodiments.

Figure 10:
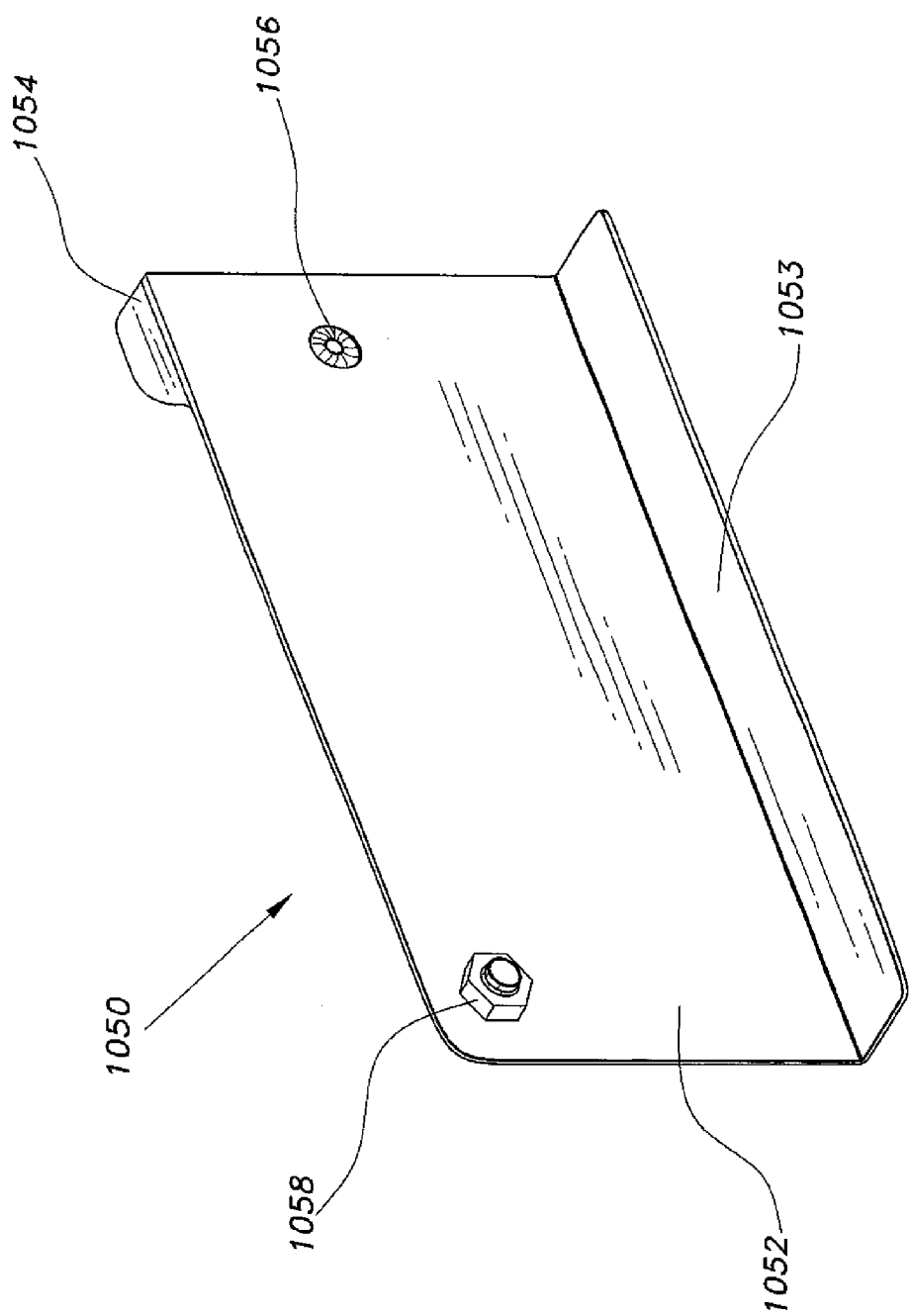
FIG. 10 is a perspective view of the alternative gate of the embodiment of the fence system of FIG. 7.

As shown in FIGS. 7 and 10, the alternative gate assembly 1050 includes an elongate, substantially rectangular gate panel having an upright, main section 1052 and an integral handle 1053 that extends orthogonal to the main section 1052. The gate panel is pivotally mounted to one of the legs of the archway via a fastener 1058. The main section 1052 serves as the barrier in the gap of the archway 1020. When pivoted to an upright position, the width of the main section 1052 spans substantially the whole length of the gap between the legs of the archway 1020. The handle 1053 is constructed as a side flange to be grasped by a user's hand. More preferably, the user can use one's foot to flip the gate panel into the closed position by placing the tip of the foot under the protruding flange and lifting quickly to pivot the gate panel. This process places less strain on the user's back and legs by eliminating the need to lower oneself towards the ground to perform the same function. The side flange construction also provides increased structural rigidity to the gate panel.

Additionally, the gate assembly 1050 includes a passive means of latching the gate panel. As shown, the main section 1052 includes a locking indention 1056 formed at a portion of the main section 1052 distal from the pivotal connection via fastener 1058 and a catch tab 1054 extending from the top edge of the main section 1052 in the opposite direction from the handle 1053. The locking indention 1056 forms a protrusion on the side distal from the pivot fastener 1058 so that when the gate assembly 1050 is pivoted into the closed, upright position, the leg upon which the main section 1052 rotates will be trapped between the protrusion and the catch tab 1054.

It is to be understood that the poultry migration fence system 10, 1000 encompasses a variety of alternatives. For example, the poultry migration fence system 10, 1000 can be constructed from various materials, such as steel, plastics, wood, composites and/or combinations thereof. The gate 52 can be constructed in any shape as long as it effectively blocks migration of poultry through the gap. Moreover, a variety of different gate constructions can be used so long as selective blocking of passage through the archways 20, 1020 can be maintained, e.g., swing gates and sliding gates. The support rail 48, 348, 3048 can be constructed in various shapes, such as tubular, hourglass, and the like. Moreover, the poultry migration fence system 10, 1000 can be provided in various colors and indicia. It is further noted that any number of bolts and fasteners can be used in the various connections described above while maintaining the functional properties of the connected components.

It is to be understood that the present invention is not limited to the embodiments described above, but encompasses any and all embodiments within the scope of the following claims.

I claim:

1. A poultry migration fence system, comprising:
    a U-shaped archway adapted to be placed over existing water/feed lines in a poultry farm, the archway having an upper curved section and depending legs, the legs defining a gap therebetween;
    at least one elongate fence panel mounted to at least one of the legs of the archway, the fence panel forming a substantially planar, upright barrier adapted for preventing poultry migration from one side of the at least one fence panel to the other side of the fence panel;
    a fence panel support assembly detachably mounted to the at least one fence panel, the fence panel support assembly having an elongate support rail pivotal between a storage position and a support position supporting and bracing the at least one fence panel from inadvertent toppling, a bolt attached to the support rail extending through the support assembly, and a fastener securing the bolt to the support assembly; and
    a gate assembly attached to one of the legs of the archway, the gate assembly selectively closing and opening the gap between the legs.

2. The poultry migration fence system according claim 1, wherein the fence panel comprises an L-shaped wire fence having an upright main section and a lower minor section extending orthogonally from the main section.

3. The poultry migration fence system according to claim 2, wherein the main section comprises a plurality of spaced vertical members, a top cross member, at least one central cross member and a bottom cross member, the bottom cross member forming a junction between the main section and the minor section, the cross members extending across the vertical members, at least the top cross member and the bottom cross member having mounting extensions extending from opposing sides of the main section, the mounting extensions being mounted to one of the legs of the archway.

4. The poultry migration fence system according to claim 3, wherein the minor section comprises a plurality of lateral spaced members and an outer cross member spanning the lateral members.

5. The poultry migration fence system according to claim 4, wherein the fence panel support assembly comprises:
    a support plate disposed below the minor section;
    at least a pair of U-bolts disposed near diagonal corners of the support plate, one of the U-bolts fastening the support plate to the bottom cross member and the other of the U-bolts fastening the support plate to the outer cross member;
    wherein the bolt is a pivot bolt attached to the support rail and extending extends through the support plate; and
    wherein the fastener securing secures the pivot bolt to the support plate;
    wherein the support rail extends along the length of the minor extension in the storage position and extends orthogonal to the main section in the support position.

6. The poultry migration fence system according to claim 4, wherein the fence panel support assembly comprises:
    an upper clamping plate having at least a pair of upper grooves, the grooves facing downward, the upper clamping plate being placed over adjacent lateral members with the upper grooves straddling the adjacent lateral members;
    a lower clamping plate having at least a pair of lower grooves, the lower grooves facing upward, the lower clamping plate being placed under the adjacent lateral members with the lower grooves straddling the adjacent lateral members;
    wherein the bolt is a bolt attached to the support rail and extending extends through the upper and lower clamping plates; and
    wherein the fastener securing secures the bolt to the upper clamping plate and clamping said clamps the adjacent lateral members between the upper and lower clamping plates;
    wherein the support rail extends along the length of the minor extension in the storage position and extends orthogonal to the main section in the support position.

7. The poultry migration fence system according to claim 4, further comprising:
    a pair of U-bolts rigidly attached to each of the legs of the archway, each of the U-bolts having a gap accommodating insertion of a corresponding one of the mounting extensions;
    a clamping plate mounted to each of the U-bolts; and
    fasteners securing and clamping each of the clamping plates onto the corresponding U-bolt, the clamping plate clamping the corresponding mounting extension to the leg of the archway.

8. The poultry migration fence system according to claim 4, further comprising:
    an upper clamping bracket fixed to at least one of the legs of the archway, the upper clamping bracket being an inverted U-shaped member defining parallel plates having aligned holes defined therein, the top cross member of the fence panel lodging in the U-shaped member;
    a first fastener extending through the aligned holes in the parallel plates and securing the top cross member to the U-shaped upper clamping bracket;
    a lower clamping bracket fixed to at least one of the legs of the archway, the lower clamping member being a J-shaped member having a U-shaped end defining parallel plates having aligned holes defined therein and an elongate plate extending from the U-shaped end, the outer cross member of the minor section lodging in the U-shaped end of the J-shaped member; and
    a second fastener extending through the aligned holes in the parallel plates of the U-shaped end of the J-shaped member and securing the outer cross member to the lower clamping bracket.

9. The poultry migration fence system according to claim 8, wherein:
    the inverted U-shaped member of the upper bracket has an edge welded to the at least one of the legs of the archway; and
    the at least one of the legs of the archway is welded on top of a corner of the elongate plate extending from the U-shaped end of the J-shaped member of the lower clamping bracket.

10. The poultry migration fence system according to claim 3, further comprising a solid accessory fence panel having means for selectively mounting the solid fence panel to the main section.

11. The poultry migration fence system according claim 10, wherein the means for mounting is selected from the group consisting of hooks, bolts, latches, and combinations thereof.

12. The poultry migration fence system according to claim 1, wherein the fence panel comprises:
    an elongate solid fence having opposing sides and a bottom; and
    at least one pair of mounting extensions laterally extending from each of the opposing sides, the mounting extensions mounting the solid fence to the archway, the fence panel support assembly being attached to the solid fence, the fence panel support assembly having at least one support bracket disposed on the bottom of the solid fence, a bolt attached to the support rail and extending through the at least one support bracket, and a fastener securing
    the bolt to the at least one support bracket.

13. The poultry migration fence system according to claim 12, further comprising:
    a pair of U-bolts rigidly attached to each of the legs of the archway, each of the U-bolts having a gap accommodating insertion of a corresponding one of the mounting extensions;
    a clamping plate mounted to each of the U-bolts; and
    fasteners securing and clamping each of the clamping plates onto the corresponding U-bolt, the clamping plate clamping the corresponding mounting extension to the leg of the archway.

14. The poultry migration fence system according claim 1, wherein, the gate assembly comprises a bolt disposed on the one of the legs of the archway, a gate pivotally mounted to the bolt, and a fastener securing the gate onto the bolt, the gate having an outwardly extending catch tab for selectively engaging a side of the one leg in order to secure the gate in the closed position.

15. The poultry migration fence system according to claim 14, wherein the gate has an indention formed at a portion of the gate distal from the pivot bolt, the indention forming a protrusion, the protrusion and the catch tab trapping the one leg of the archway therebetween, the gate further having a handle extending orthogonally therefrom for assisting user manipulation in selective opening and closing of the gate.

16. A kit for assembling a poultry migration fence system, comprising:
a U-shaped archway having an upper curved section and depending legs, the legs defining a gap therebetween;
a fence panel support assembly having an elongate support rail pivotal between a storage position and a support position, a bolt attached to the support rail extending through the support assembly, and a fastener securing the bolt to the support assembly; and
a gate assembly attached to one of the legs of the archway, the gate assembly selectively closing and opening the gap between the legs.

17. The kit according to claim 16, further comprising:
a pair of U-bolts rigidly attached to each of the legs, each of the U-bolts having a gap, the gap adapted for installation of one side of a fence panel;
a clamping plate mounted to each of the U-bolts; and
fasteners securing and clamping the clamping plate onto the corresponding U-bolt.

18. The poultry migration fence system kit according to claim 16, further comprising:
an upper clamping bracket, the upper clamping bracket being an inverted U-shaped member defining parallel plates having aligned holes defined therein, the U-shaped member having an edge welded to at least one of the legs of the archway, the U-shaped member being adapted for receiving a top cross member of a fence panel therein;
a first fastener extending through the aligned holes in the parallel plates and adapted for securing the top cross member to the U-shaped upper clamping bracket;
a lower clamping bracket, the lower clamping member being a J-shaped member having a U-shaped end defining parallel plates having aligned holes defined therein and an elongate plate extending from the U-shaped end, the at least one of the legs of the archway being welded on top of a corner of the elongated plate, the U-shaped end being adapted for receiving an outer cross member of a minor section of the fence panel; and
a second fastener extending through the aligned holes in the parallel plates of the U-shaped end of the J-shaped member and adapted for securing the outer cross member to the lower clamping bracket.

19. The kit according to claim 16, wherein the fence panel support assembly comprises:
a support plate;
at least a pair of U-bolts detachably mounted near diagonal corners of the support plate;
wherein the bolt is a pivot bolt attached to the support rail and extending through the support plate; and
wherein the fastener securing secures the pivot bolt to the support plate.

20. The kit according to claim 16, wherein the fence panel support assembly comprises:
an upper clamping plate having at least a pair of upper grooves facing downward; a lower clamping plate having at least a pair of lower grooves facing upward;
wherein the bolt is a pivot bolt attached to the support rail and extending extends through the upper and lower clamping plates; and
wherein the fastener securing secures the pivot bolt to the upper clamping plate and clamping clamps the upper and lower clamping plates together.

21. The kit according claim 16, wherein the gate assembly comprises a bolt disposed on one of the legs, a gate pivotally mounted to the bolt, and a fastener securing the gate onto the bolt, the gate having an outwardly extending catch tab for selectively engaging a side of the one leg in order to secure the gate in the closed position.

22. The poultry migration fence system kit according to claim 21, wherein the gate has an indention formed at a portion of the gate distal from the pivot bolt, the indention forming a protrusion, the protrusion and the catch tab trapping the one leg of the archway therebetween, the gate further having a handle extending orthogonally therefrom for assisting user manipulation in selective opening and closing of the gate.

23. The kit according to claim 16, further comprising a solid fence panel and means for selectively mounting the solid fence panel to a wire fence.

24. The kit according claim 23, wherein the means for mounting is selected from the group consisting of hooks, bolts, latches, and combinations thereof.

25. The kit according to claim 16, further comprising: an elongate solid fence having opposing sides and a bottom;
at least one pair of mounting extensions laterally extending from each of the opposing sides, the mounting extensions being adapted for mounting the solid fence to the archway, the fence panel support assembly being attached to the solid fence, the fence panel support assembly having at least one support bracket disposed on the bottom of the solid fence, a bolt attached to the support rail and extending through the support bracket, and a fastener securing the bolt to the support bracket.

26. A fence panel support assembly for supporting at least one fence panel, comprising:
at least one elongate support rail;
a mounting assembly for mounting the at least one elongate support rail onto the at least one fence panel, the at least one elongate support rail being pivotably attached to the mounting assembly and pivotable between a storage position and a support position supporting and bracing the at least one fence panel, from inadvertent toppling;
wherein the mounting assembly includes a bolt attached to the support rail and extending through the mounting assembly; and
a fastener securing the bolt to the mounting assembly.

27. The fence panel support assembly for supporting at least one fence panel according to claim 26, wherein the mounting assembly comprises:
a support plate;
at least a pair of U-bolts disposed near diagonal corners of the support plate, one of the U-bolts adapted for fastening the support plate to a part of the at least one fence panel and the other of the U-bolts adapted for fastening the support plate to another part of the at least one fence panel;
wherein the bolt is a pivot bolt attached to the support rail and extending through the support plate; and
wherein the fastener securing secures the pivot bolt to the support plate.

28. The fence panel support assembly for supporting at least one fence panel according to claim 26, wherein the mounting assembly comprises:
an upper clamping plate having at least a pair of upper grooves, the upper grooves facing downward, the upper clamping plate adapted for placement over a section of the at least one fence panel with the upper grooves straddling adjacent portions of the section;

a lower clamping plate having at least a pair of lower grooves, the lower grooves facing upward, the lower clamping plate adapted for placement under the section of the at least one fence panel with the lower grooves straddling the adjacent portions of the section;

the bolt is attached to the support rail and extending extends through the upper and lower clamping plates; and the fastener securing secures the bolt to the upper clamping plate, the fastener is adapted for clamping the adjacent lateral members between the upper and lower clamping plates.

* * * * *